United States Patent [19]
Martinson

[11] 3,944,255
[45] Mar. 16, 1976

[54] SAFETY DEVICE

[76] Inventor: Lennart Sune Martinson, Vanadisvagen 29, Stockholm, Sweden, S-11323

[22] Filed: Nov. 20, 1974

[21] Appl. No.: 525,632

[52] U.S. Cl............ 280/289; 40/129 R; 116/28 R
[51] Int. Cl.².................... B62J 5/00; B62J 27/00
[58] Field of Search............... 116/35 A, 28 R, 56; 40/145 A; 280/289; 248/230, 231, 204; 403/160; 24/260

[56] References Cited
UNITED STATES PATENTS

| 597,829 | 1/1898 | Heilborn | 116/56 |
|---|---|---|---|
| 2,165,704 | 7/1939 | Hood | 40/145 A |
| 2,525,299 | 10/1950 | Johnson | 248/230 X |
| 2,642,830 | 6/1953 | Aves | 116/28 A |
| 2,788,763 | 4/1957 | Ries | 280/289 X |
| 3,176,367 | 4/1965 | Risse | 24/260 |
| 3,318,615 | 5/1967 | Chreist, Jr. | 248/231 X |
| 3,387,584 | 6/1968 | Glantz | 116/28 R |
| 3,847,497 | 11/1974 | Guillory | 116/28 A X |

*Primary Examiner*—Richard C. Queisser
*Assistant Examiner*—Daniel M. Yasich
*Attorney, Agent, or Firm*—Holman & Stern

[57] ABSTRACT

A safety device or warning signal for attachment to a two-wheeled vehicle, e.g. a bicycle, arranged to be attached to a section of the framework of the vehicle and to extend transversely from same in direction towards the off-side lane in a road, having a flexible and resilient joint and a warning or signal member at the free end portion of the transversely extending part.

8 Claims, 1 Drawing Figure

U.S. Patent    March 16, 1976    3,944,255
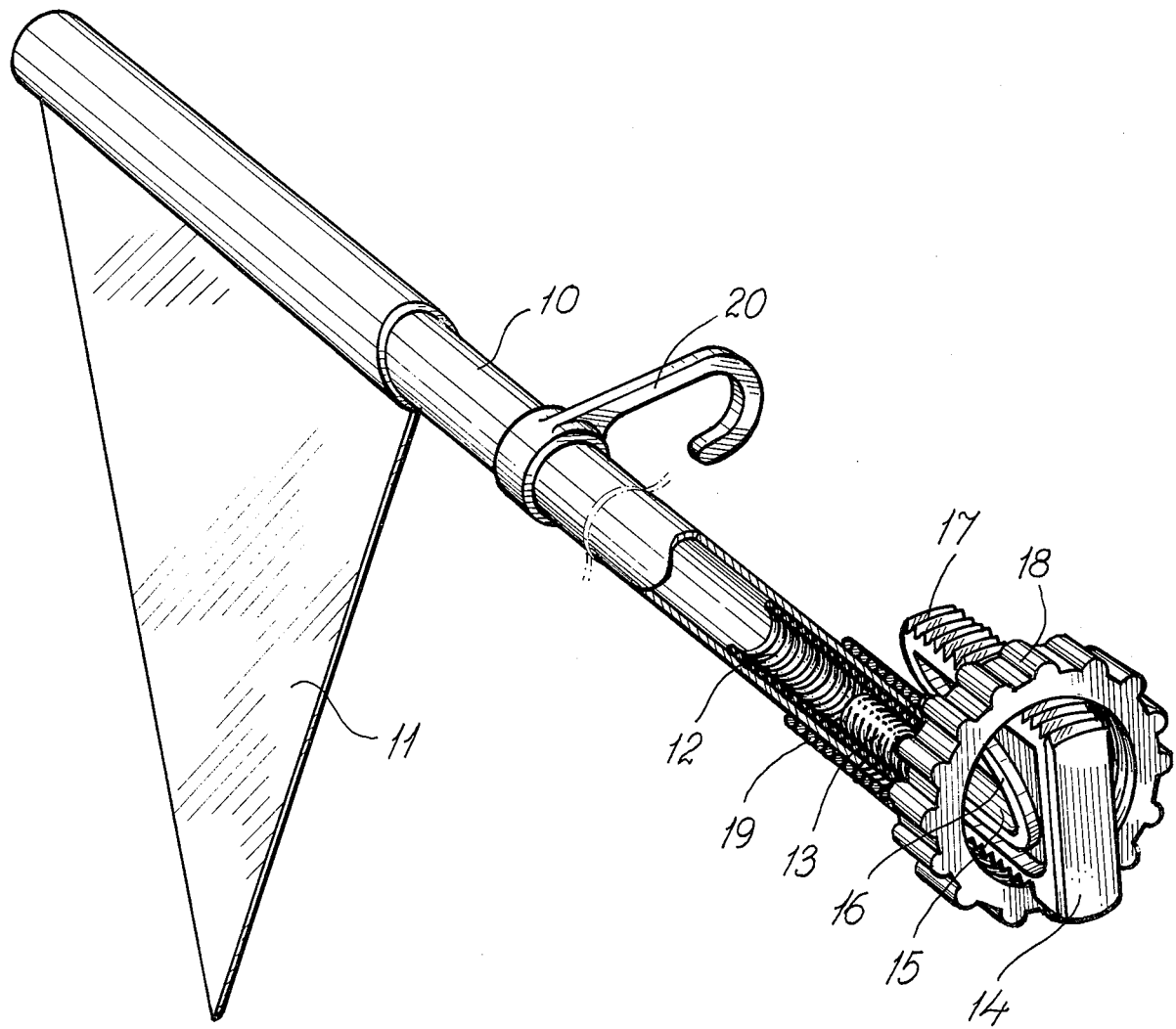

SAFETY DEVICE

FIELD OF THE INVENTION

This invention relates to a safety device and in particular, a safety device for attachment to two-wheeled vehicles, e.g. bicycles.

BACKGROUND OF THE INVENTION

It is a well known fact, that serious accidents often are caused by drivers of motor vehicles overtaking riders of bicycles without leaving sufficient space between the motor vehicle and the bicycle. Due to the pressure from the wind or other circumstances, the bicycle can easily be forced into contact with an overtaking vehicle, thus causing an accident with serious injury to the bicycle rider.

SUMMARY OF THE INVENTION

The object of this invention is to provide a novel safety device for two-wheeled vehicles, preferably bicycles, which prevents the aforementioned type of accidents. This object is achieved by means of a safety device, which, when attached, in an efficient manner acts as a warning device for overtaking vehicles. Apart from the warning effect, the safety device according to the present invention also acts a distance or gauge member, indicating the minimum space suitable for overtaking.

According to the present invention, there is provided a longitudinally extending member, at one end arranged with a means of attachment for mounting on suitable structure of a bicycle or similar vehicle, and at the other free end having a pennant or a small flag of distinctive colour. The safety device is attached to the tubular structure of a bicycle in such a way, that it extends transversely from the longitudinal axis of the bicycle towards the off-side lane of a road. The safety device furthermore includes a flexible joint member adjacent to the means of attachment, which makes it possible for the support to fold over the safety device into a position, in which it extends backwards in a parallel relationship to the longitudinal axis of the bicycle, when not in use. A second member for attachment is also arranged along the center portion of the longitudinally extending member, to enable it to be stabilized on the framework of the bicycle, when not in use.

BRIEF DESCRIPTION OF THE DRAWING

A preferred embodiment of the invention will be further described below, with reference to the accompanying drawing.

The drawing shows, partly in cross-section, a safety device according to the invention with the longitudinally extending part reduced in length.

BRIEF DESCRIPTION OF A PREFERRED EMBODIMENT

The reference numeral 10 indicates a longitudinally extending tubular part, at one free end arranged with a triangular warning member 11, preferably of a significant colour, such as red. A central part of the tubular member 10 is omitted; however, the tubular member 10 is a continously extending part, having a length at about 300 – 500 mm.

The other free end portion of the tubular member 10 is arranged with a helicoil spring member 12, partly inserted into the tubular member 10. Said spring member 12 acts as a means of attachment for a stud 13, having an external screw thread and extending from a body member 14 in the means of attachment. A mainly U-shaped groove is arranged in the body member 14, directed with the open part towards the tubular member 10 and having one side surface 15 arranged in a parallel relationship to said tubular member 10, and the opposed side surface 16 in an inclined relationship to said first side surface 15, thus creating a gradually smaller cross-section in the groove in direction from the tubular member 10. The parallel outside surfaces of the body member 14, which preferably has a primarily rectangular cross-section, are arranged with a screw thread 17 for the engagement of a tubular nut member 18. The outside surface of said nut member 18 is preferably arranged with gripping means in order to make manual installation without tools possible. A flexible member 19 is also shown embracing the end portion of the tubular member adjacent to the means of attachment, intended to act as a second resilient means and as a means of protection for the flexible joint. This second flexible member 19 can also be a helicoil spring, but also other previously known resilient and tubular means can of course be used. A hook-shaped member 20 is also shown in the figure, partly embracing the tubular member 10 and having a hookshaped portion extending transversely from the tubular member 10. Said hook-shaped member 20 is intended to serve as a second means of attachment for the safety device, thus enabling same to be folded over and fixed in a parallel relationship to the length axis of the bicycle, when not in use.

When assembling the safety device, the means of attachment for attachment to the tubular structure of a bicycle, is screwed into the helicoil spring 12 with the threaded stud 13. The diameter of said stud 13 is slightly larger than the inside diameter of the helicoil spring 12, thus expanding said spring member 12 to an increased outside diameter. Furthermore, the outside diameter of said helicoil spring 12 is arranged to correspond to, or, to be slightly less than, the inside diameter of the tubular member 10, when not expanded. This means that the helicoil spring member is forced to engage with the inside surface of the tubular member 10, when the stud 13 is screwed into the spring member 12.

The safety device is attached to the tubular structure of a bicycle, or any similar type of vehicle, in a most efficient way. A part of the tubular structure is inserted transversely between the the two opposed surfaces 15, 16 in the body member 14 of the means of attachment, whereafter the nut member 18 is run down, thus trapping the tubular member of the structure between the two opposed surfaces 15, 16 mentioned above. Since one of the aforementioned surfaces 16 is arranged in an inclined relationship to the opposed surface 15, the means of attachment can be used for tubular structure parts having various diameters and the tube will be wedged between the surfaces.

As previously mentioned, the safety device is attached in such a way, that it extends in a transverse relationship to the longitudinal axis of the bicycle, extending towards the off-side lane. This means that a vehicle overtaking is forced to leave a space from the bicycle exceeding the length of the tubular member 10. If not, no accident will be caused, since the tubular member 10 can move in any direction from the means of attachment, i.e. it will only be folded over. Obviously, this could scratch a car or any other vehicle overtaking, but this is also a safety measure, since most car owners dislike having their cars scratched. This fact will further encourage any party overtaking to keep well away from a bicycle arranged with a safety device according to the present invention.

The safety device according to the present invention can preferably be manufactured from a synthetic plastic material, thus combining low weight and a good resistance against corrosion, however, also other suitable materials can be used.

The warning member 11 at the free end portion of the tubular part 10, is also preferably manufactured from a synthetic plasic material, if desired, the warning effect can be increased by the use of a reflective material, thus making it possible to notice the safety device at a larger distance and under poor light conditions.

The safety device according to the present invention is in no way restricted to the embodiment described and showed on the accompanying drawing, since many modifications are possible within the scope of the invention and the following claims.

What I claim is:

1. A signal-safety device for use on a bicycle-type vehicle for extending laterally therefrom and warning other vehicles to maintain a prescribed distance, said signal-safety device comprising; an elongated, substantially rigid element of a length defining a clear safe distance for passing vehicles; mounting means at one end of said element for mounting the rigid element in laterally-extending relationship from a frame member of the vehicle upon which the signal-safety device is to be used; a signal device at the other end of said rigid element for warning an oncoming vehicle of the presence of the vehicle upon which the signal-safety device is mounted and apprising the oncoming vehicle of the clear, safe distance at which to pass the signal-safety device; and a flexible, resilient joint means interposed between said rigid element and said mounting means so that the signal-safety device will yield when struck by an oncoming vehicle and will not damage the same nor the vehicle upon which it is mounted and will permit the signal-safety device to be folded along the frame of the vehicle upon which it is mounted to permit storage of the signal-safety device, said rigid element being tubular and said resilient joint means comprising a helical coil spring element telescoped into the tubular rigid element, said mounting means comprising a stud threaded into said coil spring element and a reverted, externally-threaded, U-shaped element for receiving a frame member of the vehicle transversely therethrough, and a nut element circumposed about said U-shaped element for clampingly engaging the transverse frame member in the U-shaped element.

2. The structure as claimed in claim 1 in which said U-shaped element has opposed, divergent side portions for accommodating different diametered vehicle frame members and providing a wedging engagement with the frame member when engaged by the nut element.

3. The structure as claimed in claim 1 including a resilient member disposed about the exterior of the substantially rigid element and said helical coil spring and stud threaded therein for reinforcing and protecting the resilient joint means.

4. The structure as claimed in claim 1 in which said signal device comprises a flag-like element having a distinctive and readily visible color.

5. The structure as claimed in claim 4 in which said flag-like element comprises a light-reflective material.

6. The structure as claimed in claim 1 in which said rigid element includes a hook element projecting laterally from an intermediate portion thereof for removably engaging a rod-like portion of a vehicle frame member when the rigid rod element is folded into parallel relationship thereto about the resilient joint means.

7. The structure as claimed in claim 1 in which said stud being externally threaded and having an outer diameter slightly greater than the internal diameter of the helical coil spring element for expanding the coil spring in the tubular, rigid element and providing a rigid connection between the stud member and the rigid tubular element.

8. The structure as claimed in claim 7, in which a second resilient member is circumposed about the flexible, resilient joint means between the rigid element and said mounting means for reinforcing and protecting the resilient joint means.

* * * * *